April 13, 1965  W. G. McKENZIE  3,178,056
LUBRICATING SYSTEM
Original Filed March 16, 1959  4 Sheets-Sheet 1
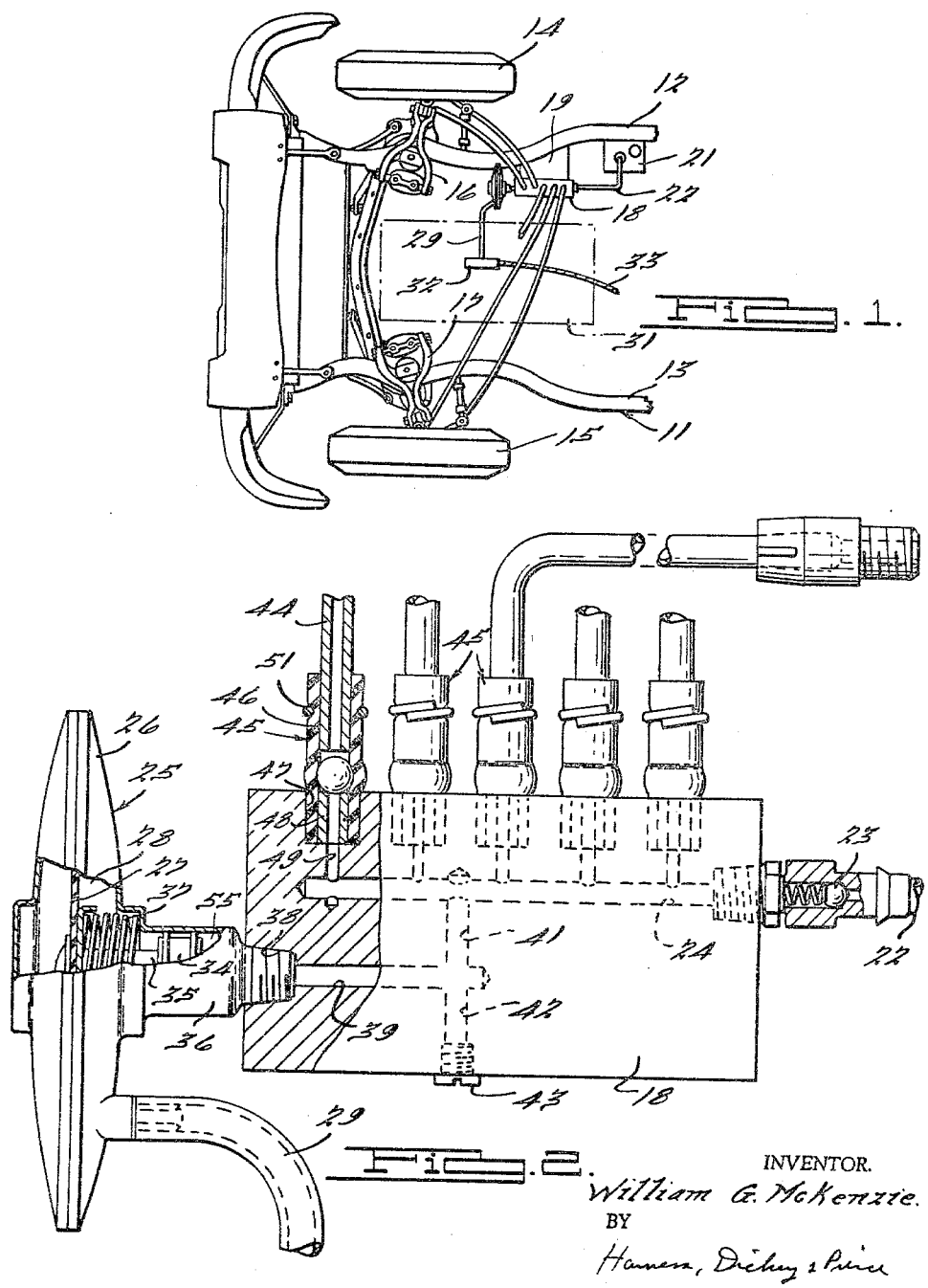
INVENTOR.
William G. McKenzie
BY
Hauser, Dickey & Pierce
ATTORNEYS.

April 13, 1965   W. G. McKENZIE   3,178,056
LUBRICATING SYSTEM
Original Filed March 16, 1959   4 Sheets-Sheet 2
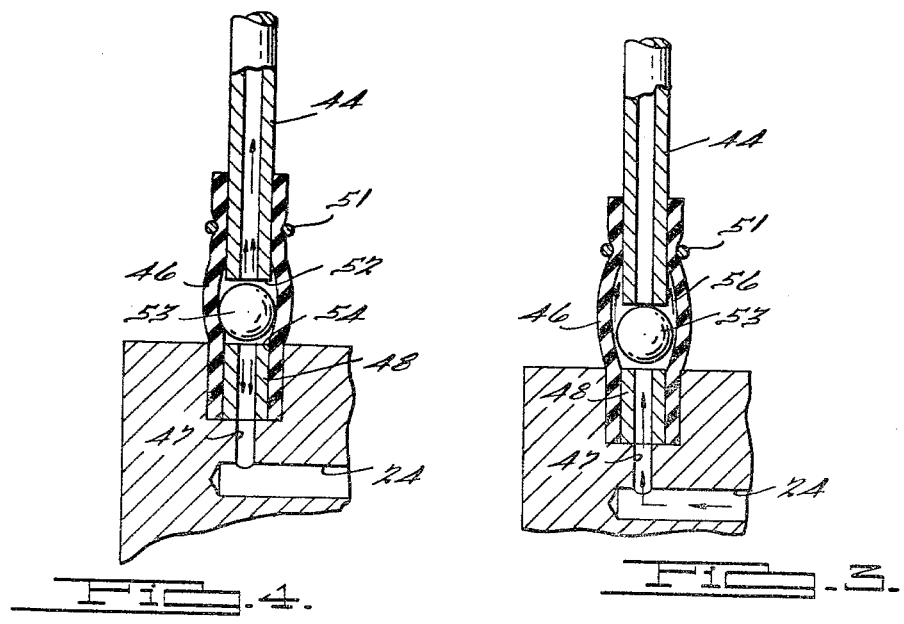
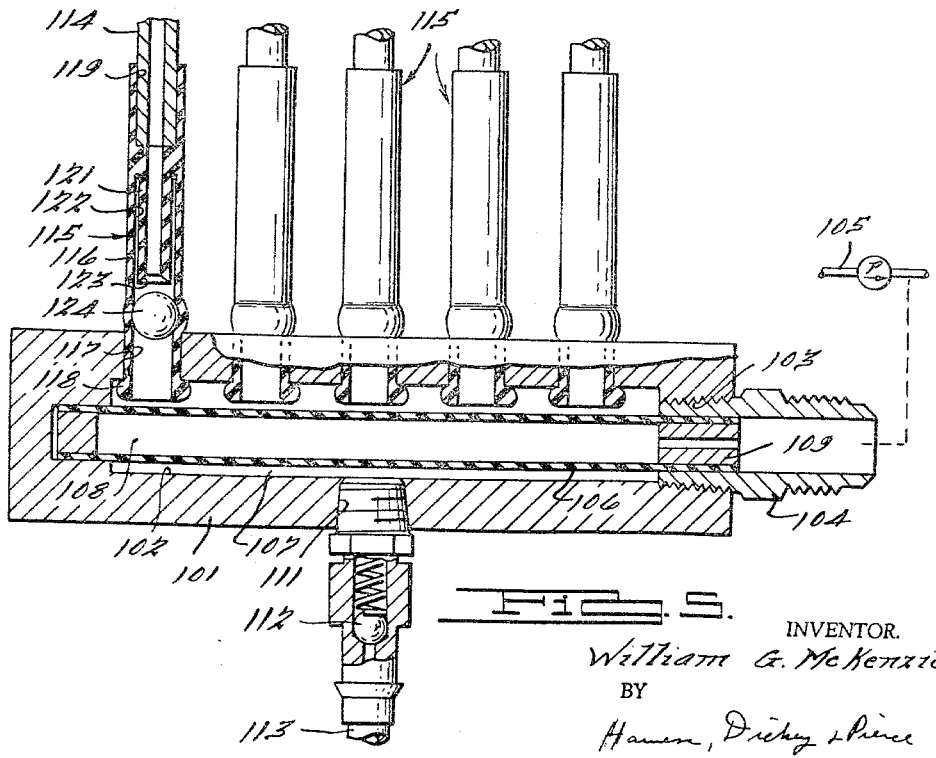
INVENTOR.
William G. McKenzie
BY
Hauser, Dickey & Pierce
ATTORNEYS.

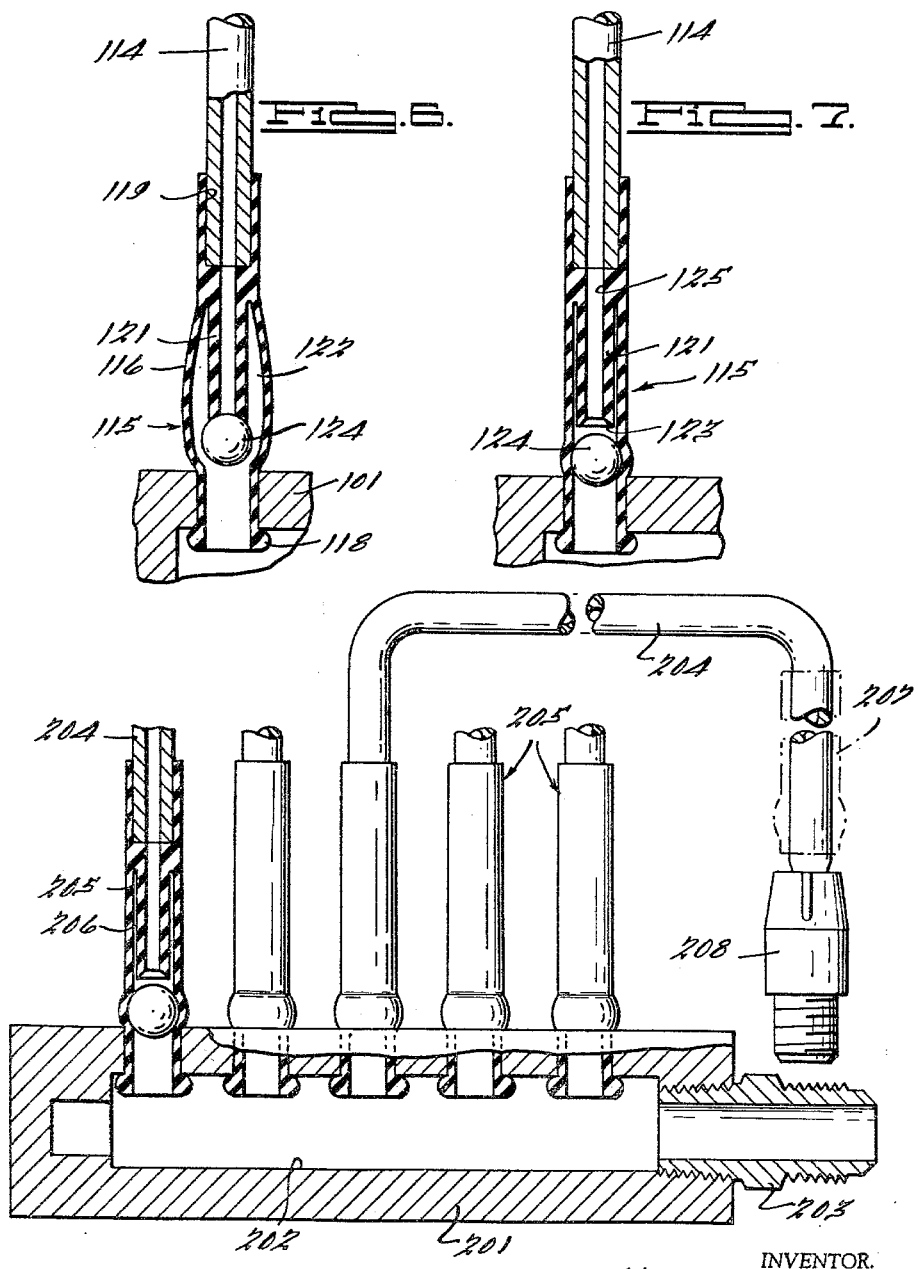

April 13, 1965     W. G. McKENZIE     3,178,056
LUBRICATING SYSTEM
Original Filed March 16, 1959     4 Sheets-Sheet 4
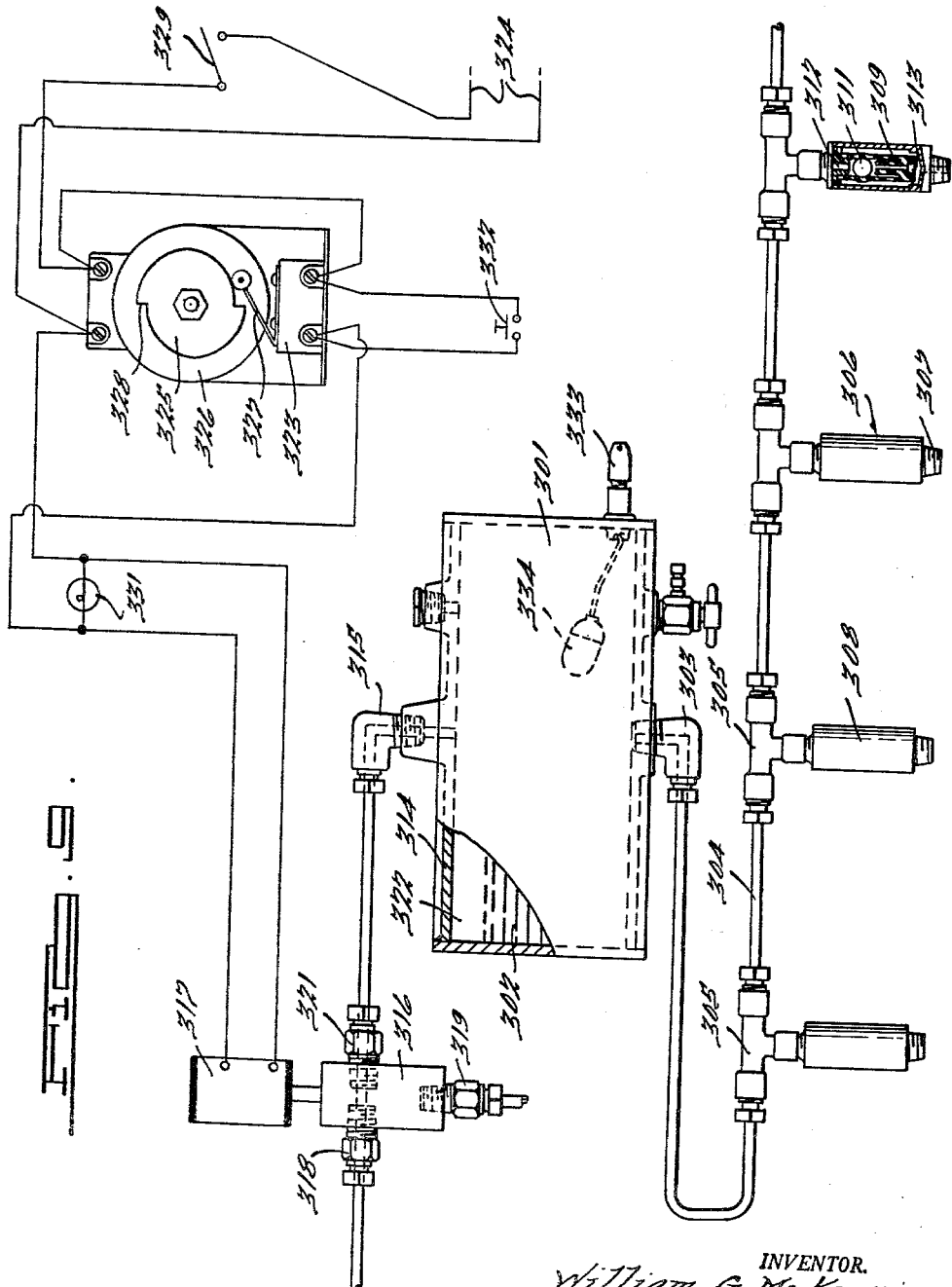
INVENTOR.
William G. McKenzie
BY
Hansen, Dickey & Price
ATTORNEYS.

United States Patent Office 3,178,056
Patented Apr. 13, 1965

3,178,056
LUBRICATING SYSTEM
William G. McKenzie, Racine, Wis., assignor to Walker
Manufacturing Company of Wisconsin, Racine, Wis., a
corporation of Wisconsin
Original application Mar. 16, 1959, Ser. No. 799,787, now
Patent No. 3,051,263, dated Aug. 28, 1962. Divided
and this application Sept. 22, 1961, Ser. No. 146,396
1 Claim. (Cl. 222—23)

This application is a division of my co-pending application entitled Lubricating System, filed March 16, 1959, Serial No. 799,787, now Patent No. 3,051,263 of August 28, 1962.

This invention relates to lubricating systems, and more particularly to systems for periodically applying predetermined amounts of lubricant to mechanisms such as automobile vehicles or industrial machinery.

It is an object of the invention to provide an improved lubricating system which may be used in stationary equipment or on vehicles, and which provides for automatic metering of the lubricant supply to several bearings upon periodic system actuation.

It is also an object of the invention to provide an improved lubricating system of this nature which may be controlled either manually or by operation of the equipment being lubricated, assuring proper supply of lubricant to all necessary bearings.

It is another object to provide an improved lubricating system for automotive type vehicles which is operable by manifold vacuum, engine oil pressure, or other power sources, and in which either engine oil or a separate bearing lubricant may be utilized for lubricating the bearings.

It is a further object to provide an improved lubricating system of the above nature which automatically meters the amount of lubricant supplied to each bearing, and in which the amount metered may be varied to suit requirements.

It is also an object to provide a lubricating system of this character which will tend to automatically clear any clogged lines which may exist, so that all bearings will receive their proper supply of lubricant.

It is another object to provide an improved lubricant system of this nature which is relatively inexpensive to construct and operate, and may be fabricated of standard materials and components.

It is a further object to provide a novel and improved fluid metering device for use in lubricating systems or the like, which is of simple and inexpensive construction and is capable of accurate and reliable measurements of successive fluid portions.

Other objects, features, and advantages of the present invention will become apparent from the subsequent description, taken in conjunction with the accompanying drawings.

In the drawings:

FIGURE 1 is a fragmentary top elevational view of the front of an automobile chassis showing one embodiment of the invention incorporated therein;

FIGURE 2 is a partially cross-sectioned elevational view of the pump and valve supporting body and its associated parts, showing one of the metering devices in its unpressurized condition;

FIGURE 3 is an enlarged fragmentary cross-sectional view in elevation of one of the metering devices shown in its pressurized condition;

FIGURE 4 is a view similar to FIGURE 3 showing the metering device as the pressure is relieved;

FIGURE 5 is a cross-sectioned elevational view of another embodiment of the invention operable by engine oil pressure;

FIGURE 6 is an enlarged fragmentary elevational view of one of the metering devices of the embodiment of FIGURE 5 shown in its pressurized condition;

FIGURE 7 is a view similar to FIGURE 6 showing the metering device in its unpressurized condition;

FIGURE 8 is an elevational view in cross-section of still another embodiment of the invention in which engine oil may be directly utilized for bearing lubricating purposes; and FIGURE 9 is a schematic view of still another embodiment of the invention adapted for use in industrial establishments.

In general terms, the illustrated embodiments of the invention each comprises a manifold block or other support to which is connected a plurality of lines leading to separate bearings in a mechanism such as an automotive chassis or to one or more machines in an industrial plant. Mounted in each of these lines is a metering device comprising an expandable chamber, preferably a short section of resilient tubing. Within this tubing is a spherical member or ball movable toward and away from a position in which it closes the connection between the tubing and the bearing. Means are connected to the manifold block for intermittently feeding lubricant under pressure from the block to the tubing. When this pressure is applied, the ball moves to cut off flow to the bearing, but the tubing bulges or expands, filling with lubricant. The tubing is provided with an annular pocket for retaining a predetermined quantity of lubricant upon such expansion. When pressure is released at the block, the tubing contracts and, part of the lubricant with which the tubing pocket had been previously filled is squeezed into the line leading to the bearing, the ball simultaneously withdrawing from its closed position.

Referring more particularly to the embodiment shown in FIGURES 1-4 of the drawings, FIGURE 1 shows an automobile chassis generally indicated at 11 comprising a pair of longitudinal frame members 12 and 13, front wheels 14 and 15, and front wheel suspensions 16 and 17 respectively. The novel lubricant system of the invention comprises a lubricant manifold block 18 mounted on a bracket 19 in the engine compartment. A reservoir 21 is carried by frame 11 and is adapted to carry a supply of lubricant for the automobile bearings. This reservoir is connected to block 18 by a conduit 22 which contains a check valve 23, as shown in FIGURE 2. Check valve 23 prevents back flow to the reservoir and is connected to a longitudinal conduit 24 within block 18.

A pump generally indicated at 25 is mounted on the other end of block 18 and comprises a circular housing 26 within which is disposed a diaphragm 27. One chamber 28 of housing 26 is connected by a conduit 29 to the intake manifold of the automobile engine shown in dot-dash lines at 31 in FIGURE 1, this connection being made by means shown at 32. If desired, a valve (not shown) manually controlled by a cable 33 leading to the vehicle dashboard may be mounted within means 32 so that pump 25 may be manually controlled, instead of automatically controlled by starting and stopping of the engine.

Diaphragm 27 is connected to a piston 34 by a piston rod 35, piston 34 being disposed within a cylinder 36 connected with housing 26. A helical compression spring 37 is disposed within housing 26 and urges diaphragm 27 and its associated parts to the left in FIGURE 2. The outer end of cylinder 36 is connected to a port 38 in block 18, this connection also serving as a support for pump 25. A conduit 39 extends inwardly from port 38, and a cross conduit 41 connects conduit 39 to conduit 24 within block 18. An air vent comprising a conduit 42 and a plug 43 is connected to conduit 41, so that any air which may accumulate in the system may be periodically removed. If appropriate, this air vent may be located in an upper portion of block 18.

A plurality of bearing feed lines 44 are connected to conduit 24 of block 18, and lead to the various bearings in front wheel suspensions 16 and 17 as well as to other bearings in the vehicle which are to be periodically lubricated. A plurality of lubricant metering devices generally indicated at 45 are disposed in lines 44, these metering devices being mounted on block 18 in the illustrated embodiment. It will be understood, however, that metering device 45 could be located at other points in line 44, or in branch lines which lead from any of lines 44 to the various bearings.

The constructional details of each metering device 45 are best seen in FIGURES 2–4. The metering device comprises a short section of tubing 46, this tubing being fabricated of a resilient material and preferably having special characteristics which make it suitable for the purpose of carrying lubricant. The material of which tubing sections 46 are fabricated should be resistant to decomposition by exposure to lubricants as well as to other substances normally found under driving conditions. The tubing should also have constant temperature flexing characteristics for purposes which will appear below. Suitable materials may be found in various families of plastics and could include substances such as neoprene.

As seen in FIGURE 2, the lower end of each tubing section 46 is secured within a port 47 in block 18 by an insert 48, port 47 being connected to conduit 24 by a short passage 49. The outer end of tubing 46 is secured to its corresponding line 44 by a spring-like ring 51, this ring being axially adjustable on tubing 46.

As seen particularly in FIGURES 3 and 4, tubing 46 overlaps line 44 by a substantial amount, and ring 51 is located some distance away from the end 52 of line 44. A spherical member or ball 53 is disposed within tubing 46 between end 52 of line 44 and end 54 of insert 48, the distance between ends 52 and 54 being somewhat greater than the ball diameter. The size of ball 53 is made larger than the unstressed internal diameter of tubing 46, so that the latter will snugly engage the ball.

In operation, the entire system will normally be filled with a bearing lubricant. Upon application of vacuum to chamber 28 of pump 25, diaphragm 27 will be urged to the right in FIGURE 2, forcing lubricant from chamber 55 of the pump into passages 39, 41, 24 and 49. This will cause outward pressure on balls 53 in metering devices 46, the balls moving from the position shown in FIGURE 2 to that shown in FIGURE 3. Balls 53 will thus engage seats 52 of lines 44, preventing further flow of lubricant to the bearings. At the same time, tubing sections 46 will bulge or expand, with the lubricant flowing past balls 53 into an annular pocket 56 which will be formed between the end of line 44 and the overlapping portion of tubing 46. This annular pocket is best seen in FIGURE 3, and it will be noted that the size of the pocket will be controlled by various factors, including the axial position of ring 51 and the elasticity of the tubing. The importance of constant temperature flexing characteristics for the tubing will thus be recognized.

Upon return of chamber 28 to atmospheric pressure, either by the shutting off of engine 31 or by manual operation of cable 33, spring 37 will return piston 44 to its leftward position, in FIGURE 2. The initial result of this movement will be a reduction of pressure in lines 49, and the pressure previously built up in annular chambers 56 will thus force balls 53 downwardly to the position shown in FIGURE 4. Tubes 46 will contract, and in doing so will partially deplete chambers 56, some of this lubricant flowing upwardly through lines 44 and other portions flowing downwardly past balls 53 into passage 49. This dual flow is shown by the upwardly and downwardly pointing arrows in FIGURE 4. The resilient strength of tubes 46 is preferably sufficient to overcome the frictional effect of lines 44, so that lubricant may flow through lines 44 to the various bearings of the vehicle.

Should a line 44 become clogged, the build up of pressure in such line will be such as to prevent the corresponding ball 53 from seating on seat 52 when pressure is applied to the block. This will result in an automatic clean-out of the clogged line, the strength of pump 25 being preferably such that this unclogging may be accomplished. It should be noted that it is unnecessary for ball 53 to close the connection between tube 46 and passage 49 when the pressure is released, since some return of lubricant to the block will not interfere with the functioning of the system in any way. The amount of lubricant flowing to the various lines 44 may be individually adjusted by the axial positions of rings 51, and also, if desired, by the type of material used for tubes 44.

During the last portion of the return stroke of piston 34 after chamber 28 has been returned to atmospheric pressure, the reduction of pressure in conduit 24 will be such that additional lubricant will be drawn from reservoir 21 through conduit 22 into block 18.

FIGURES 5–7 illustrate another embodiment of the invention which is generally similar to that of FIGURES 1–4 but which discloses a somewhat different type of metering device, and utilizes pressure such as that from the engine oil system to operate the lubricating system. The system of FIGURES 5–7 comprises an elongated block 101 mounted in the engine compartment or other appropriate location and having a central longitudinal bore 102 closed at one end and open at the other end by means of a threaded port 103. A connection 104 is threadably mounted in port 103 and is adapted to be connected to the pressure side of the engine lubricating system shown partially in schematic fashion at 105. A tubular diaphragm 106 is disposed within bore 102 so as to form an annular chamber 107 and a central chamber 108, the central chamber being connected to connector 104 by means of orifice member 109 to prevent surging. Annular chamber 107 is connected to a reservoir (not shown) similar to reservoir 21 which may contain bearing lubricant, this connection being by means of a port 111 in block 101, a check valve 112 and a conduit 113.

A plurality of bearing feed lines 114 are connected to annular chamber 107, these connections being made by means of metering devices generally indicated at 115. Each metering device comprises a section of tubing 116 made of material similar to that previously described with respect to tubing 46. The inner end of each tubing section passes through a port 117 in block 101 connecting with annular chamber 107, a ridge 118 being formed at the end of tubing 115 to hold the tubing in position. The outer end of tubing 116 has a recess 119 by means of which it may be tightly fastened to line 114.

A valve portion 121 is integrally formed in an intermediate portion of tubing 116 and extends toward block 101 in spaced relation with the main portion of the tubing, thus forming an annular pocket 122. A valve seat 123 is formed at the lower end of portion 121, and a spherical member 124 is disposed within tubing 116 between valve seat 123 and block 101. The distance between the valve seat and the block is such as to permit some movement of ball 124, and as in the previous embodiment, the ball diameter is larger than the unstressed internal diameter of tubing 116.

In operation of the embodiment of FIGURES 5–7, application of pressure to the inside of diaphragm 106, such as by starting the engine, will cause this tubular diaphragm to operate, decreasing the size of chamber 107. This will cause the lubricant within chamber 107 to be forced into tubings 116, moving balls 124 against valve seats 123. Further expansion of diaphragm 106 will force lubricant past the balls into annular pocket 122, tubings 116 expanding or bulging so that a quantity of lubricant will be received by each pocket 122, as seen in FIGURE 6.

When pressure inside diaphragm 106 is relaxed, such as by shutting off the engine, tubing sections 116 will contract and balls 124 will move downwardly from valve seat 123 as seen in FIGURE 7. This will cause a portion of the lubricant held by pocket 122 to be forced through bore 125 in valve portion 121 into lines 114, some of the lubricant also returning to chamber 107. Further contraction of diaphragm 106 will cause replenishment of chamber 107 by lubricant drawn from the reservoir conduit 113. The quantity of lubricant delivered to feed lines 114 by each expansion and contraction of tubing sections 116 may of course be varied by choosing proper proportions for pockets 122.

FIGURE 8 illustrates still another embodiment of the invention which is similar to that of FIGURES 5–7 but is adapted for use in installations where engine oil is to be utilized for bearing lubrication, or where the bearing lubricant is supplied by a pump controlled separately from the engine. This embodiment comprises a block 201 having a longitudinal chamber 202 therein and a connector 203 leading from one end of this chamber for connection to an engine lubricating system (not shown) or to a separately controlled bearing lubricant pump. A plurality of bearing feed lines 204 are connected to chamber 202 by means of metering device 205, these devices being constructed similarly to those of the previous embodiment. Assuming that the same lubricant is used for both the engine and the bearings, tubular diaphragm 206 is no longer necessary; nor is a connection to a lubricant reservoir, although the latter would be necessary if the device of FIGURE 8 were connected to a separately controlled lubricant pump.

In operation of the embodiment of FIGURE 8, pressurization of the lubricant in the system by starting of the engine (or operation of the separately controlled lubricant pump) will cause the annular pockets 206 in metering device 205 to be filled with lubricant, and when the pressure is reduced, the lubricant will be forced into feed lines 204 by contraction of the metering device tubes.

FIGURE 8 also illustrates an alternate position for one of the metering devices, as indicated in dot-dash lines at 207. It will be noted that this position is adjacent a connection 208 at the outer end of corresponding line 204. As mentioned previously, metering devices 207 may be located at any position along lines 204 or their branches.

FIGURE 9 shows still another embodiment of the invention adapted for use in industrial plants, especially those which have a number of machines or other operating parts in different locations which require periodic lubrication. While air actuation is shown, any other type of actuator can be used. The system includes a reservoir 301 containing a supply of lubricant 302, the underside of reservoir 301 having an outlet port 303. This outlet port leads to a header 304 having a plurality of T connections 305 along its extent. A metering unit generally indicated at 306 has an outlet end 307 that is adapted to be connected to each T connection in the same general manner as a conventional lubricant fitting and can be screwed into any place a grease or lubrication fitting would be normally installed. Each metering unit comprises a casing 308 of cylindrical shape within which is disposed a tubular metering device 309 of resilient material, this metering device being of the same general construction as those illustrated in FIGURES 5–8. The metering device encloses a spherical member 311 and is connected by a port 312 to T connection 305. The outlet end 313 of each metering device is connected with exit port 307 of the metering unit.

Reservoir 301 has a cover 314 which carries an air pressure port 315, this port being connected to a three-way valve 316 controlled by a solenoid 317. Valve 316 is provided with a supply port 318, an exhaust port 319 and a working port 321 connected to port 315. When valve 316 is in one position, pressure port 318 will be connected to port 315, thus causing pressure to be exerted on lubricant 302 within reservoir 301. When valve 316 is in its other position, air chamber 322 above lubricant 302 will be connected to exhaust port 319.

Valve 316 is normally in its exhaust position, but is shiftable to its pressure position by solenoid 317. This solenoid is controlled by a switch 323 which is in series with the solenoid and with a supply source 324. Switch 323 is normally open but is closable by a double-lobed cam 325 which is driven by a motor 326 and engages an arm 327 on switch 323. The shape of cam 325 is such that when the cam is rotated clockwise from the position shown in FIGURE 9, switch 323 will be closed. When the next shoulder 328 of the cam is reached, switch 323 will be opened. Thus, assuming manually operated switch 329 is closed, solenoid 317 will be energized and deenergized twice during each revolution of cam 325.

A lamp 331 is placed across the circuit of solenoid 317 to indicate energization of the solenoid, so that no attempt will be made to fill the reservoir when it is pressurized. A manual push button switch 332 is provided for by-passing switch 323 when manually controlled lubrication is desired. A whistle 333 is mounted in the lower portion of reservoir 301, and is actuatable by a float 334 when the lubricant has dropped below a predetermined level, the air in chamber 322 operating the whistle.

In operation, switch 329 will be closed, thus energizing motor 326. Upon rotation of cam 325 from its FIGURE 9 position solenoid 317 will be energized, causing chamber 322 to be pressurized. Lubricant 302 will be forced through header 304 and into metering units 306. The annular pockets in metering devices 309 will be filled as in the previous embodiment, it being noted that casing 308 will prevent excessive expansion of each metering device. When the next shoulder 328 of cam 325 reaches arm 327, switch 323 will open, shifting valve 316 to its exhaust position. The release of pressure on lubricant 302 will permit contraction of metering devices 309, forcing lubricant past spherical members 311 toward the bearings to be lubricated.

It will thus be seen that a simple and efficient lubricating system has been provided which automatically assures a controlled lubricant supply to all the bearings of an automotive vehicle or of machines in a factory, without the need of individual attention to these parts.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim. Thus, while I prefer to use resilient tubing to form the expandable chambers, they could, within the broad purview of the invention, be formed in other ways. Thus, an expandable chamber could be formed by using a spring pressed piston to form a yieldable wall portion of an otherwise rigidly walled chamber.

What is claimed is:

In a system for intermittently metering fluid to a plurality of points, a reservoir containing said fluid, a pressure medium, a connection between said pressure medium and said reservoir, a valve in said connection shiftable between a normal exhaust position and a pressure position, a solenoid for operating said valve, means responsive to a predetermined cycle for intermittently closing and opening the circuit of said solenoid to shift said valve between its exhaust and pressure positions, whereby the fluid in said reservoir will be alternately pressurized and de-pressurized, means indicating pressurizing and de-pressurizing of said fluid, a plurality of feed lines connected to said reservoir, and a metering device in each of said feed lines comprising means for temporarily retaining a predetermined amount of fluid in response to the pressurizing of said fluid and for forcing at least a portion of said retained fluid toward the delivery end of the feed line in response to de-pressurizing of said fluid.

References Cited by the Examiner
UNITED STATES PATENTS

| | | |
|---|---|---|
| 458,450 | 8/91 | Fitzgerald. |
| 2,048,323 | 7/36 | Cutts. |
| 2,260,904 | 10/41 | Horton. |
| 2,478,260 | 8/49 | Fioretti _____ 222—335 |
| 2,498,407 | 2/50 | Fine. |
| 2,705,094 | 1/55 | Howell _____ 222—335 |
| 2,742,978 | 4/56 | Peterson et al. |
| 3,005,330 | 10/61 | Bochan _____ 222—334 |

LOUIS J. DEMBO, *Primary Examiner.*

LAVERNE D. GEIGER, *Examiner.*